Figure 1:
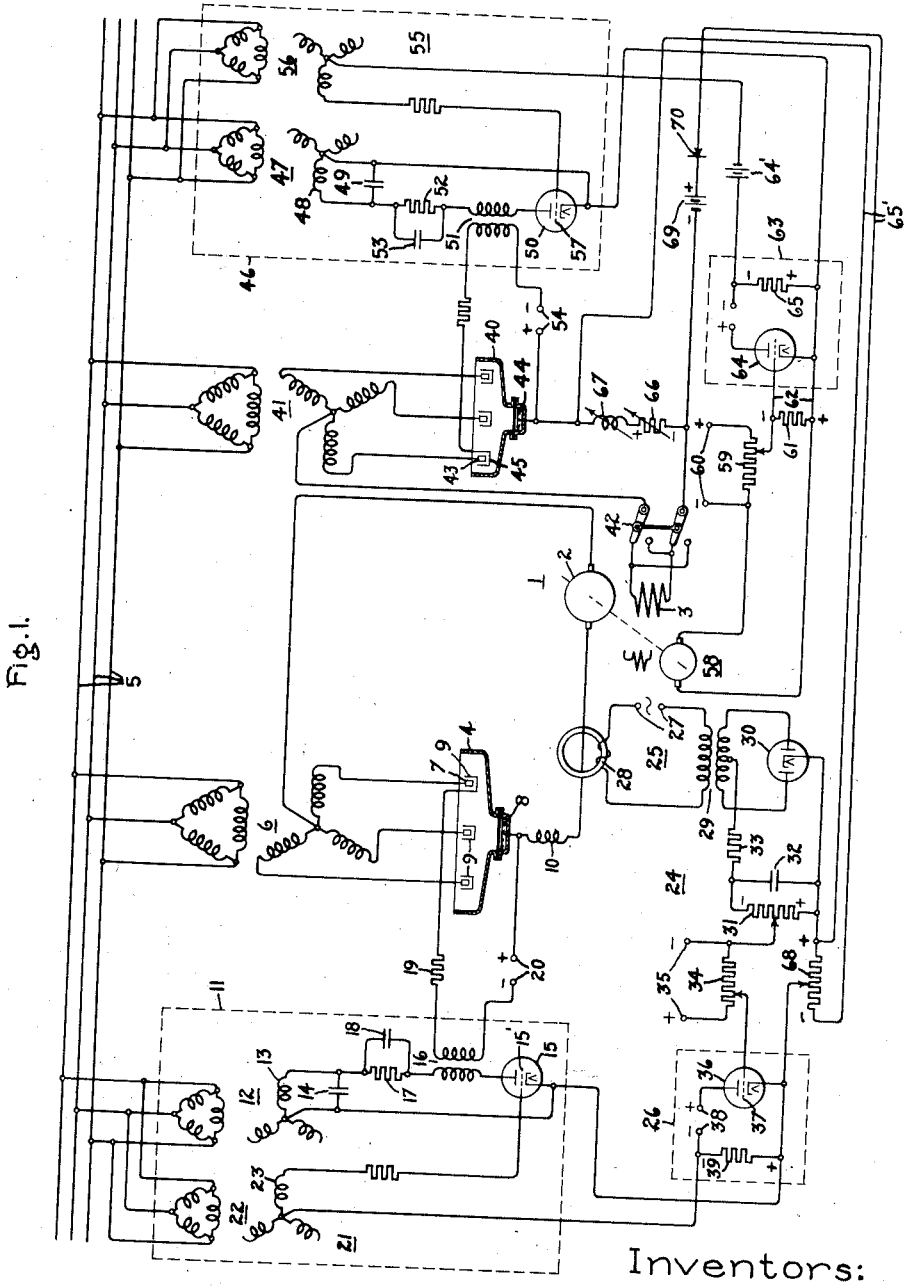

Inventors:
Hans Bechmann,
Johannes Förster,
Gustav Reinhardt,
Max Stöhr,
by Harry E. Dunham
Their Attorney.

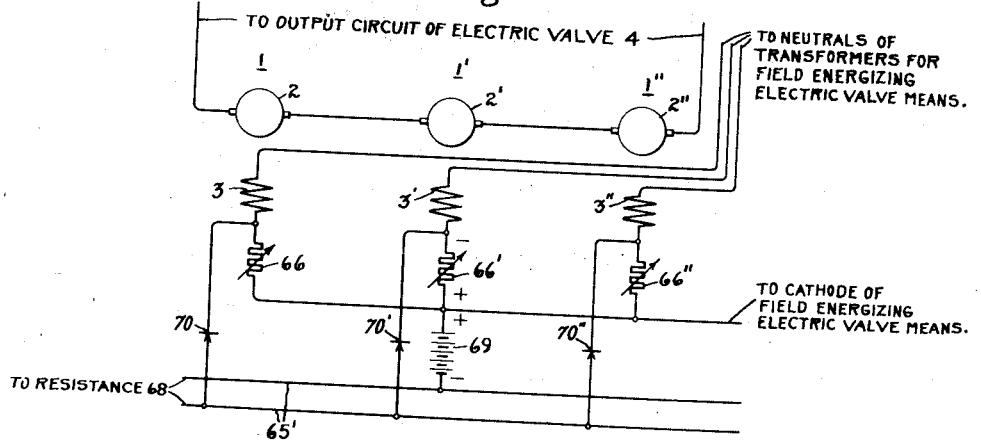
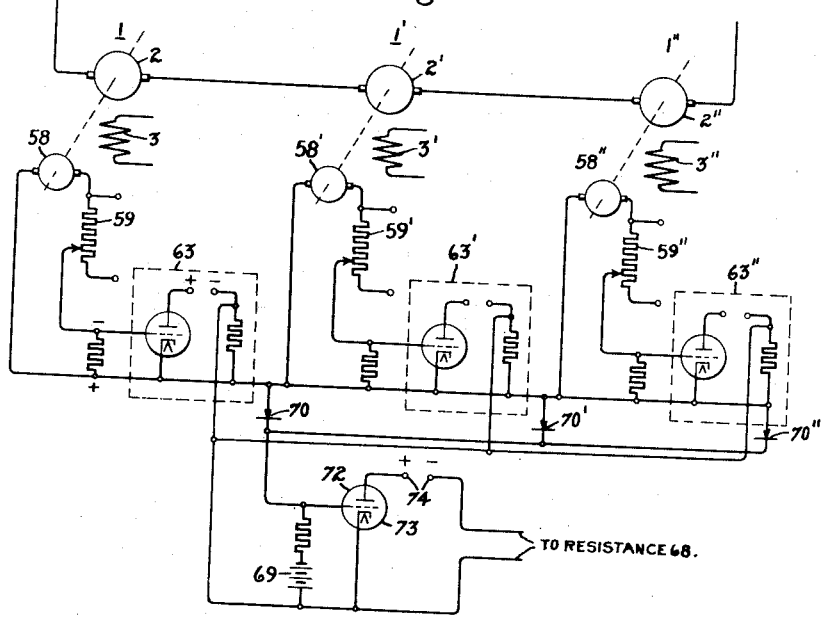

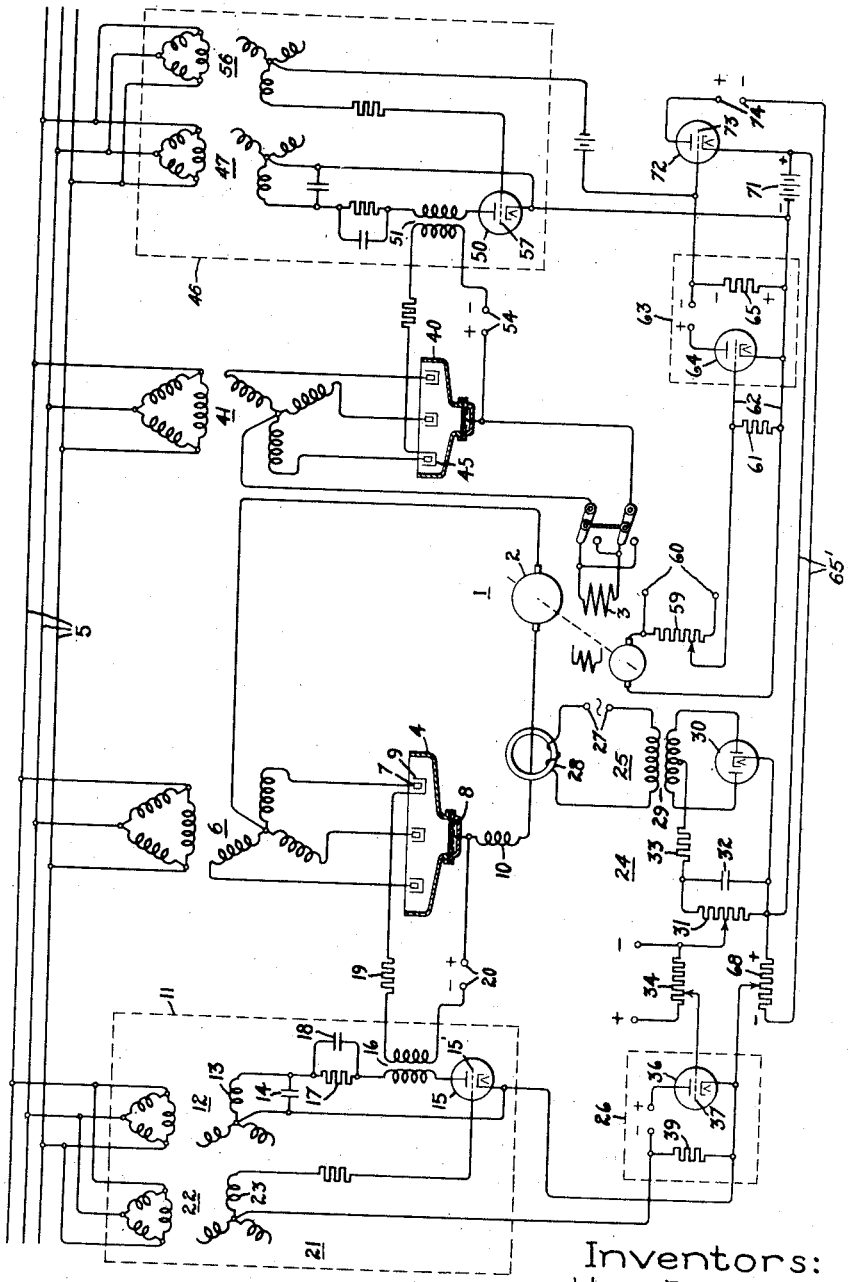

Patented Sept. 1, 1942

2,294,709

UNITED STATES PATENT OFFICE 2,294,709

ELECTRIC MOTOR CONTROL SYSTEM

Hans Bechmann, Berlin-Charlottenburg, Johannes Förster, Berlin, Gustav Reinhardt, Berlin-Frohnau, and Max Stöhr, Berlin-Hermsdorf, Germany, assignors to General Electric Company, a corporation of New York Application June 14, 1940, Serial No. 340,604
In Germany July 8, 1939

12 Claims. (Cl. 172—239)

Our invention relates to electric motor control systems and more particularly to electric valve apparatus for controlling an operating condition, such as the speed, of dynamo-electric machines.

In many applications where electric valve apparatus has been employed to control an operating condition, such as the speed of dynamo-electric machines, the necessary flexibility or range of speed control imposes upon the associated alternating current supply circuit low power factor conditions under some operating loads. In accordance with the teachings of our invention described hereinafter, we provide new and improved electric valve control systems for dynamo-electric machines wherein the power factor conditions are substantially improved without sacrificing flexibility and precision of control.

It is an object of our invention to provide new and improved motor control systems.

It is another object of our invention to provide new and improved electric valve translating circuits for energizing and controlling dynamo-electric machines.

It is a further object of our invention to provide new and improved control systems comprising electric valve apparatus for controlling an operating condition, such as the speed, of dynamo-electric machines of the direct current type.

It is a still further object of our invention to provide new and improved methods of controlling the speed of motors of the direct current type.

Briefly stated, in the illustrated embodiments of our invention we provide electric valve translating circuits for controlling an operating condition or an electrical characteristic, such as speed, of dynamo-electric machines. Electric valve means supply substantially constant current to the armature winding of a direct current motor, and the field winding of the motor is variably energized to maintain the speed of the motor constant under predetermined ranges of load imposed upon the motor. Regulating means are associated with the electric valve means to maintain the current at any one of a number of different current values. Additional control means, responsive to the amount of current transmitted to the field winding, controls the regulating means to vary the value of current, or the level of the armature current, when the load imposed upon the motor varies beyond definite range of values. By maintaining the armature current substantially constant under variable load conditions, the power factor of the input current to the electric valve means is maintained at a relatively high value, thereby obviating a disadvantage of the prior art arrangements.

For a better understanding of our invention, reference may be had to the following description taken in connection with the accompanying drawings, and its scope will be pointed out in the appended claims. Fig. 1 diagrammatically illustrates an embodiment of our invention as applied to a control or regulating system for a direct current motor, and Fig. 2 represents a modification thereof as applied to a system for controlling a plurality of direct current motors. Fig. 3 is a modification of the arrangement of Fig. 1 and includes certain amplifying and control devices to effect the desired change or variation in the value of armature current which is supplied to the direct current motor. Fig. 4 illustrates the arrangement of Fig. 3 as applied to a plurality of direct current motors.

Referring now to Fig. 1, we have there illustrated our invention as applied to a system for controlling an operating condition or an electrical characteristic, such as the speed, of a direct current motor 1 having an armature 2 and an excitation or field winding 3. We provide electric valve means 4 for transmitting unidirectional current to the armature 2 from an alternating current supply circuit 5 through a transformer 6. The electric valve means 4 is preferably of the type comprising an ionizable medium, such as a gas or a vapor, and may include a plurality of anodes 7, a cathode 8, and a plurality of control members or grids 9 associated with each of the anodes 7. A current limiting or smoothing inductance 10 is provided in series relation with the output of the electric valve means 4 and the armature 2.

In order to control the conductivity of the electric valve means 4 and to control thereby its output current and the current supplied to armature 2 of motor 1, we employ a control or excitation circuit 11 which impresses on the grids 9 periodic voltages of controllable or adjustable phase position with respect to the voltage of circuit 5. Control circuit 11 comprises a transformer 12 having secondary windings 13, a plurality of capacitances 14, only one of which is shown and each of which is charged from an associated different one of the secondary windings 13, and a control electric discharge device 15 which discharges the capacitance 14 through a transformer 16 to generate the periodic voltage which is impressed on the associated grid 9. Control electric discharge device 15 is also preferably of the type employing an ionizable medium and comprises a grid 15′. A suitable means for increasing the peaks of the periodic voltage, such as a circuit including a parallel connected resistance 17 and a capacitance 18, may also be connected in series relation with the primary winding of transformer 16. The magnitude of the current transmitted to the grids 9 of electric valve means 4 may be limited by means of a resistance 19, and a suitable source of negative biasing potential 20 may also be provided in circuit with each of the grids 9.

The time at which the control electric discharge device 15 is rendered conducting, and hence the time of generation of the periodic control voltages impressed on grids 9, is controlled by means of circuit 21 comprising a transformer 22 having secondary windings 23, each of which is connected to a different one of the control electric discharge devices 15. It will be understood that the number of control circuits corresponds to the number of anodes and associated grids of the electric valve means 4 which it is required to control. For example, for the electric valve means 4 represented, it would be necessary to employ three circuits such as that shown connected to the right-hand grid of electric valve means 4.

As an agency for controlling the conductivity or the current conducted by electric valve means 4 to maintain the armature current at a substantially constant value, we provide a control or regulating circuit 24 comprising a current responsive means 25 and an amplifier 26. The current responsive means 25 may comprise a source of alternating current 27 and a magnetic control element 28 which is magnetized in response to the magnitude of the unidirectional current transmitted to armature 2 of motor 1. The current responsive means 25 also includes a transformer 29 and a suitable rectifier, such as a bi-phase rectifier 30, which produces a control voltage across a resistance 31 and a capacitance 32. A current limiting resistance 33 may be connected in series relation with resistance 31 and capacitance 32, if desired. A suitable reference voltage may be employed, if desired, as a standard against which the control voltage furnished by resistance 31 operates. This reference voltage may be provided by means of a voltage divider 34 energized from a suitable source of direct current 35. The resultant voltage is impressed upon grid 37 of an electronic discharge device 36 which operates as an amplifier. The anode-cathode circuit of the discharge device 36 may be energized from a source of direct current 38 to produce a negative control voltage across resistance 39.

We provide electric valve means 40 for transmitting variable amounts of unidirectional current to the field winding 3 of direct current motor 1. The electric valve means 40 may be energized from alternating current circuit 5 through a transformer 41 and a suitable reversing switch 42 may be connected in series relation with the output of electric valve means 40 to control the direction of rotation of motor 1. The electric valve means 40 is also preferably of the type comprising an ionizable medium, such as a gas or a vapor, and may include a plurality of anodes 43, a cathode 44 and a plurality of grids 45.

The current conducted by the electric valve means 40 is controlled by excitation circuit 46 which produces voltages of adjustable phase position relative to the voltage of circuit 5. Excitation circuit 46 comprises a transformer 47 having a plurality of secondary windings 48, a plurality of capacitances 49, only one of which is represented, and a plurality of electric discharge devices 50 which discharge the associated capacitances 49 through transformers 51 to impress on the associated grids 45 periodic voltages. Additional means, such as a resistance 52 and a capacitance 53, may be connected in series relation with each of the discharge devices 50 and transformers 51, if desired to increase the peaks of the periodic voltages. Negative biasing potentials may be impressed on grids 45, by means of a direct current circuit 54, to maintain the associated discharge paths non-conducting in the absence of periodic voltages. The conductivity of the discharge device 50 is controlled by means of circuit 55 comprising transformer 56 which impresses a periodic voltage on grid 57.

As a means for controlling the conductivity of electric valve means 40 and hence for controlling the energization of field winding 3 in response to the speed of motor 1, we provide a suitable speed responsive means such as a tachometer generator 58, the armature voltage of which varies in response to the speed of motor 1. The output voltage of the tachometer generator 58 operates against a reference voltage which may be produced by means of a voltage divider 59 energized from a source of current 60. A suitable resistance 61 is connected in series relation with the operative portion of the voltage divider 59 to variably energize the input circuit 62 of an amplifier, such as an electronic amplifier 63. The electronic amplifier 63 comprises an electric discharge device 64, preferably of the high vacuum type, and a resistance 65 across which appears the output voltage. The output voltage appearing across resistance 65 may operate in the same sense as the voltage produced by a bias battery 64′, the combined effect serving to control the time during each cycle of anode-cathode voltage at which the control electric discharge device 50 is rendered conducting.

To vary or adjust the value of constant current which is transmitted to armature 2 of motor 1 in response to a predetermined controlling influence, such as the amount of current transmitted to the field winding 3, we provide a circuit 65′ which is connected between suitable impedance means, such as a resistance 66 and an inductance 67 connected in series relation with field winding 3 and resistance 68 which is connected in circuit with the input circuit of electronic discharge device 36 of amplifier 26. If the energization of the field winding 3 varies beyond a predetermined range of values, the voltage appearing across the elements 66 and 67 increases sufficiently to force a current through resistance 68 in opposition to a reference voltage furnished by a suitable means, such as a battery 69, and through a unidirectional conducting device, such as a rectifier 70. Upon reaching a predetermined value determined by the energization of field winding 3, a voltage appears across resistance 68 to establish or pre-establish a different value of constant current to be transmitted to armature 2 of motor 1.

The operation of the embodiment of our invention shown in Fig. 1 will be explained by considering the system when the system is controlling the motor 1 to maintain its speed substantially constant. The nominal value of the armature current is maintained at a constant value so long as the load variation imposed on motor 1 does not exceed a predetermined value or range of values. If the load imposed on motor 1 does exceed this range of values, as indicated by the energization of field winding 3, the value of the constant armature current is automatically varied to preestablish a different value of armature current.

Considering more particularly the operation of the system, the electric valve means 4, through the regulating means 24, transmits a substantially constant current to the armature 2 of motor 1. This control is effected by varying the phase of the periodic voltage produced by excitation circuit 11 relative to the voltage supplied to the anodes 7 of electric valve means 4. The phase position of the periodic voltages produced by excitation circuit 11 is controlled by regulating means 24 comprising the current responsive means 25 and the amplifier 26. The magnitude of the unidirectional voltage produced by the amplifier 26, in conjunction with the alternating voltage produced by transformer 22, controls the time during each cycle of voltage of circuit 5 at which the control electric discharge device 15 is rendered conducting.

Current responsive means 25 produces a voltage across a primary winding of transformer 29 which varies in response to the magnitude of the direct current supplied to armature 2. The circuit comprising rectifier 30 produces a variable unidirectional control voltage across resistance 31 which, in turn, cooperates with the reference voltage furnished by voltage divider 34 to control the current conducted by discharge device 36.

The current responsive means 25 may be arranged so that it produces a decreased rectified voltage across resistance 31 when the current transmitted to armature 2 of motor 1 tends to exceed a predetermined value. Conversely, when the armature current tends to decrease below that predetermind value, the voltage appearing across resistance 31 increases. The variation in the voltage of resistance 31 controls the amplifier 26 to increase and decrease the negative voltage impressed on grid 15' of discharge device 15 so that the phase of the periodic voltage impressed on grid 9 varies to maintain the armature current at a definite value for a definite range of energization of field winding 3.

Electric valve means 40 transmits variable amounts of unidirectional current to the field winding 3 of motor 1, in response to slight changes in speed thereof, to maintain the speed at a substantially constant value. That is, if the speed tends to increase above a predetermined value, the phase of the voltages impressed on grids 45 is advanced by means of excitation circuit 46 to increase the energization of the field winding 3, thereby restoring the speed to the desired value. Conversely, if the speed tends to decrease, the phase of the periodic voltages impressed on grids 45 will be retarded, effecting a reduction in the value of the current transmitted to winding 3 and consequently raising the speed to the desired constant value. The amplifier 63 amplifies the variations in voltage appearing across resistance 61 occasioned by changes in the output voltage of tachometer generator 58 due to slight variations in the speed of motor 1.

For definite ranges of load imposed on motor 1, the armature current supplied to the armature by electric valve means 4 is maintained at a constant value. However, if the load imposed on motor 1 tends to exceed a definite value, circuit 63 introduces an additional voltage in the input circuit of amplifier 26 to establish a definite current level or current value transmitted to armature 2. The energization of the field winding 3 is employed as a criterion of the range of load imposed on motor 1. For example, if the energization of the field winding 3 tends to increase beyond a certain value, indicating an increase in load imposed on motor 1, circuit 63 will conduct current when the voltage appearing across resistance 66 and inductance 67 is greater than the voltage produced by battery 69. Current flowing through the resistance 68 introduces an additional bias voltage in the input circuit of amplifier 26 to effect an increase in the negative voltage appearing across resistance 39, thereby lowering the value of constant current which is transmitted to armature 2 of motor 1. In this manner, it will be appreciated that the value of constant current maintained in the armature of motor 1 is controlled or established by the load imposed thereon. In addition, the field energization of motor 1 is employed as a criterion of the load imposed on the motor and is also employed to establish the current level of the armature current. When the load variation exceeds the above described range at which constant current is maintained, the armature current of motor 1 is automatically varied in response to speed variations.

The speed of the motor 1 which the system maintains may be adjusted by means of the voltage divider 59. It will be understood that instead of using a reversing switch 42 connected between the output circuit of electric valve means 40 and field winding 3 of motor 1, we may employ two electric valve means selectively controllable to determine the direction of energization of field winding 3 and, hence, select the direction of rotation of motor 1.

Fig. 2 diagrammatically illustrates a modification of our invention as applied to a system for controlling a plurality of motors. The motor 1 and its associated elements have been assigned reference numerals corresponding to similar elements in Fig. 1 and additional motors 1' and 1" are shown connected in the system. The armatures 2, 2' and 2" are shown as being energized in series relation from the output circuit of the electric valve means 4 and constant current is transmitted thereto. Each of the motors is provided with speed controlling means (not shown) such as that shown in Fig. 1, and the control elements are interconnected through circuit 65' so that the constant current transmitted to the armatures is adjusted in accordance with the requirements of the motor from which the greatest torque is demanded. The voltage drops across the resistances 66, 66' and 66" in the control circuits are derived through rectifiers or unidirectional conducting devices 70, 70' and 70" so that the maximum voltage drop will determine the nominal armature current transmitted to the armatures of the plurality of motors. In this arrangement, inasmuch as the control voltages are obtained across resistances 66, 66' and 66", the variations in currents corresponding to load variations of the respective motors will be effected substantially simultaneously to initiate the control of the electric valve means 4, thereby establishing a different current level depending upon the motor which is required to deliver the greatest torque.

The system shown in Fig. 2 operates to control a plurality of motors in substantially the same way as that explained above in connection with Fig. 1 wherein the speed of a single motor is controlled. Constant current is transmitted to the armatures of the motors 1, 1' and 1", and the field energization of each motor is controlled individually to maintain the speed of that motor at a substantially constant value. The value of the constant current transmitted to the armatures is determined by the motor which is required to deliver the greatest torque.

Fig. 3 represents another modification of our invention which is similar in many respects to that shown in Fig. 1 and corresponding elements have been assigned like reference numerals. In the arrangement of Fig. 3, the output voltage of the amplifier 63 is shown as operating against the voltage of a battery 71 connected to the grid 73 of an intermediate amplifier discharge device 72, the anode-cathode circuit of which is energized from a suitable source of current 74. The voltage of the battery 71 here determines the speed at which the adjustment of the armature current is initiated; that is, the adjustment of the armature current transmitted to armature 2 of motor 1 is not effected until the voltage appearing across resistance 65 attains a definite value. In other words, the automatic adjustment of the armature current is not effected until the speed deviation reaches a definite value.

Fig. 4 shows a modification of Fig. 3 applied to the control of a plurality of direct current motors 1, 1' and 1". The speed of each of the motors is controlled by individual means, such as that shown in Figs. 1 and 3, by varying the amount of current transmitted to the field windings 3, 3' and 3". So long as the output voltages of the amplifiers 63, 63' and 63" are larger than the voltage of the battery 69, no current flows in the intermediate amplifier including discharge device 72. In this manner, the armature current is adjusted only when the speed deviates by a predetermined number of revolutions from a predetermined speed. The adjustment of the armature current is determined by the motor which indicates the maximum speed deviation from the nominal or required speed. The other motors for which the armature current is adjusted at the same time automatically adjust the excitation or energization of the respective field windings to maintain the speed constant. The adjustment of the armature current by means of the intermediate amplifier discharge device 72 has a further advantage in the range of the larger excitation currents due to the increased slope of the discharge device when it operates on the lower knee of the saturation curve producing a considerably larger adjustment of the armature current for a given variation in the excitation current which counteracts or compensates for the greater inertia of the regulating system in this region.

As soon as the intermediate amplifier including discharge device 72 comes into operation, there is provided a continuous adjustment of the nominal value of armature current transmitted to the motors. In some instances and applications step-by-step adjustment will suffice. This step-by-step control may be obtained by providing a suitable relay, patterned after an ammeter contact making and breaking device, connected in the excitation circuit to provide a step-by-step control of the value of armature current maintained in the system.

We have found that our invention offers decided advantages over the prior art, among which are improvements in efficiency of operation and power factor, even when the motors are not fully loaded. In addition, we have found that the systems operate with great rapidity to maintain the speed constant under variable load conditions, and that this automatic speed regulation is effected very precisely even under wide variations of load applied to the motors.

While we have shown and described our invention as applied to particular systems of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a motor of the direct current type having an armature and a field winding, electric valve means for supplying current to said armature winding, regulating means responsive to a predetermined operating condition of said motor for said last mentioned means to establish predetermined different values of constant current to be transmitted to said armature winding, and means responsive to the speed of said motor for variably energizing said field winding to maintain the speed of said motor constant.

2. In combination, a direct current motor having an armature and a field winding, means for transmitting current to said armature winding, regulating means for said last mentioned means to maintain the current transmitted to said armature winding at a substantially constant value, means responsive to the speed of said motor for transmitting variable amounts of current to said field winding to maintain the speed constant, and means for varying the value of constant current transmitted to said armature winding in response to the current transmitted to said field winding.

3. In combination, a direct current motor having an armature and a field winding, means for transmitting current to said armature winding, regulating means for said last mentioned means to maintain the current transmitted to said armature winding at a substantially constant value, means responsive to the speed of said motor for transmitting variable amounts of current to said field winding to maintain the speed constant, and means responsive to a predetermined operating condition of said motor for controlling the regulating means to preestablish different values of current transmitted to said armature winding.

4. In combination, a motor of the direct current type having an armature and a field winding, an alternating current circuit, electric valve means connected between said circuit and said armature winding for transmitting current thereto and having a control member, regulating means responsive to the current transmitted to said armature winding for variably energizing said control member to maintain said current at a substantially constant value, and means for variably energizing said field winding to maintain the speed of said motor at a constant value.

5. In combination, an alternating current circuit, a direct current motor having an armature and a field winding, means for energizing said armature, regulating means for said last mentioned means to maintain the armature current at a substantially constant value, electric valve means connected between said circuit and said field winding for transmitting current thereto, and means responsive to the speed of said motor for controlling said electric valve means to maintain the speed of said motor at a constant value.

6. In combination, an alternating current circuit, a direct current motor having an armature and a field winding, means for energizing said armature from said alternating current circuit, and means responsive to the speed of said motor to maintain the armature current at a substantially constant value, means for transmitting current to said field winding comprising electric valve means, means responsive to the speed of said motor for controlling said electric valve means to maintain the speed at a substantially constant value, and means connected between said field winding and said first mentioned means to modify the operation of said first mentioned means when the energization of said field winding varies beyond a predetermined range of value.

7. In combination, an alternating current circuit, a direct current motor having an armature and a field winding, means for energizing said armature, regulating means for said last mentioned means to maintain the armature current at a substantially constant value, means connected between said field winding and said alternating current circuit for transmitting current to said field winding, means responsive to the speed of said motor for controlling said electric valve means to maintain the speed of said motor at a substantially constant value, and means for modifying the action of said regulating means to change the value of current supplied to said armature comprising a source of reference voltage and a unidirectional conducting device connected between said field winding and said regulating means.

8. The method of controlling the speed of a direct current motor having an armature and a field winding which comprises transmitting a substantially constant current to said armature winding, varying the energization of said field winding to maintain the speed of said motor substantially constant under varying load conditions within a predetermined range of load, and varying the value of the current transmitted to said armature when the energization of said field winding exceeds a predetermined range of values.

9. In combination, an alternating current circuit, a plurality of direct current motors each having an armature and a field winding, the armature windings of said motors being connected in series relation, means for transmitting a substantially constant current to said armature winding from said alternating current circuit, a plurality of individual means each associated with a different one of said motors for variably energizing the field winding of each motor in response to the respective speeds thereof to maintain the speeds of said motors substantially constant, and means selectively responsive to said last mentioned means for controlling the magnitude of the current transmitted to said armatures in accordance with that motor which is required to deliver the greatest torque.

10. In combination, a plurality of direct current motors each comprising an armature and a field winding, the armatures being connected in series relation, means for transmitting a substantially constant current to said armatures, individual means each associated with a different one of said motors for controlling the energization of the associated field winding of each motor in response to the respective speeds thereof, and means connected between said last mentioned means and said first mentioned means for changing the value of current transmitted to said armatures in accordance with the operation of that motor subjected to the greatest variation in a predetermined operating condition.

11. In combination, a plurality of direct current motors, each having an armature winding and a field winding, the armature windings of said motors being connected in series relation, means for transmitting a substantially constant current to said armature windings, a plurality of means each associated with a different one of said motors for producing a control voltage which varies in accordance with a predetermined operating condition of the associated motor, a plurality of means each associated with a different one of said field windings for variably energizing the associated field winding in response to the control voltage, and means responsive to the various control voltages to establish the value of armature current in response to the predominating control voltage.

12. In combination, a plurality of direct current motors each having an armature winding and a field winding, the armature windings of said motors being connected in series relation, means for transmitting a substantially constant current to said armature windings, a plurality of means each associated with a different one of said motors for producing a control voltage which varies in accordance with the speed of the associated motor, a plurality of means each associated with a different one of said field windings for variably energizing the associated field winding in response to the control voltage produced by the associated last mentioned means, and means selectively responsive to the predominating control voltage to establish a different value of armature current when the speed of one of said motors exceeds a predetermined range of values.

HANS BECHMANN.
JOHANNES FÖRSTER.
GUSTAV REINHARDT.
MAX STÖHR.